United States Patent [19]

Tretiakoff et al.

[11] Patent Number: 4,664,632

[45] Date of Patent: May 12, 1987

[54] TACTILE READING DEVICE

[76] Inventors: Oleg Tretiakoff; Andrée Tretiakoff, both of 16, route de Grasse, 06780 Saint Cezaire, France

[21] Appl. No.: 840,577

[22] PCT Filed: May 24, 1985

[86] PCT No.: PCT/FR85/00128

§ 371 Date: Jan. 24, 1986

§ 102(e) Date: Jan. 24, 1986

[87] PCT Pub. No.: WO85/05480

PCT Pub. Date: Dec. 5, 1985

[30] Foreign Application Priority Data

May 24, 1984 [FR] France .................. 84 08143

[51] Int. Cl.⁴ .............................. G09B 21/00
[52] U.S. Cl. ...................................... 434/114
[58] Field of Search ...................... 434/114, 113

[56] References Cited

U.S. PATENT DOCUMENTS

| 4,266,936 | 5/1981 | Rose et al. | 434/114 |
| 4,283,178 | 8/1981 | Tetzlaff | 434/114 |
| 4,305,067 | 12/1981 | Tretiakoff et al. | 434/114 X |
| 4,379,697 | 4/1983 | Linvill | 434/114 |
| 4,473,356 | 9/1984 | Fernando et al. | 434/114 |

FOREIGN PATENT DOCUMENTS

| 3035852 | 5/1982 | Fed. Rep. of Germany | 434/113 |
| 2463466 | 3/1981 | France | 434/114 |

Primary Examiner—William H. Grieb
Attorney, Agent, or Firm—Stiefel, Gross, Kurland & Pavane

[57] ABSTRACT

Tactile reading device presenting a reading surface (3) provided with openings (4) for tactile pins (5) mounted with an axial and reciprocating sliding motion between a projected position and a retracted position with respect to the surface (3) and which are each displaceable between the two positions by one end of an actuating element (9) of which the other end is fixed. The element is capable of a certain displacement by curvature deformation perpendicularly to its axis between two extreme positions by applying a control force. The actuating element (9) is so arranged that its curvature direction is substantially perpendicular to the displacement direction of the tactile pin (5). Displacement emitter means (14) provided between the actuation element (9) and the pin (5) present a neutral point at the vicinity of that of extreme positions of said element (2) wherein the pin (5) is projecting, and a stop (7) prevents the element (9) from assuming a curvature beyond the extreme position.

8 Claims, 7 Drawing Figures

TACTILE READING DEVICE

The present invention relates to tactile reading devices of the type having a reading surface provided with openings for a number of tactile rods mounted for reciprocal axial sliding between a protruding position and a retracted position with respect to said surface, each of which rods are movable between said positions via one end of an elongated actuating element of which the other end is fixed, said element being capable of moving to a certain extent by bending deformation perpendicularly to its longitudinal axis between two outermost positions by the application of an operating force thereto.

In known devices of this type, piezo-electric elements are used for actuating the sensing rods. A typical example of the prior art is illustrated in U.S. Pat. No. 4,283,178, in which the piezo-electric elements are arranged perpendicularly to the tactile rods and deform by bending axially to the tactile rods. One important disadvantage with this type of design resides in the fact that the pressure applied to the protruding sensing rods by the finger of the reader, has to be compensated by applying more electrical power to the piezo-electric elements than what would be necessary just for keeping the sensing rods in the protruding position. Understandably, it is necessary for the reader to apply a minimum of pressure with his fingers on the sensing rods in order to determine the character represented by the pattern of the protruding sensing rods.

In another known device, illustrated in French Patent No. 2 399 555, every tactile rod is controlled by means of two piezo-electric elements extending in parallel to the axis of the tactile rod and disposed on either side of said axis, their free ends being connected to the tactile rod by means of connecting bars. According to this disposition, the electric power is applied to the piezo-electric elements only in short pulses for switching the sensing rod from the protruding position to the retracted position, or vice-versa. Thus, the piezo-electric elements must have a mechanical stiffness which is sufficient to ensure the necessary "reading pressure" when the protruding rods are touched by the reader's fingers. However, if, by accident, too great a force is applied on the ends of the protruding tactile rods, these could be returned to the retracted position and cause malfunctioning of the device, seeing that there are no means for indicating to the controlling electronic circuits whether a sensing rod is in a protruding position or in a retracted position.

It is the object of the present invention to overcome the above disadvantages of the known devices by proposing a tactile reading device in which the inward movement of the sensing rods under the pressure applied by the reader's finger is positively limited without the need for applying extra operating power to the actuating elements in order to counteract the reading pressure.

A tactile reading device according to the invention is characterized by the fact that direction of curvature deformation of the actuating element is substantially perpendicular to the direction of displacement of the sensing rod, and that displacement transmitting means are provided between said actuating element and the sensing rod, said displacement transmitting means having a substantially neutral point close to that of the end position of the actuating element in which the sensing rod is protruding. An abutment may be provided to prevent the actuating element from bending beyond said end position.

When piezo-electric actuating elements are used, the invention permits a considerable reduction of the volume of the elements insofar as the electric power to be stored inside said elements during operation is considerably reduced compared to what was needed in the previously known devices. By way of example, the piezo-electric elements used in the device according to U.S. Pat. No. 4,283,178 have a volume of about 140 mm$^3$, whereas in a device according to the present invention, the piezo-electric elements may have a volume less than 25 mm$^3$.

According to one embodiment of the invention, the longitudinal axis of the actuating element is parallel to the reading surface; according to another embodiment, the longitudinal axis of the actuating element is perpendicular to the reading surface. The advantage of this last embodiment is that it permits the construction of a device comprising any number of lines of contiguous characters.

According to the invention, the displacement transmitting means preferably include an elastic element.

According to a special feature of the invention, said displacement transmitting means are in the form of a connecting element of which the ends are connected to the actuating element and to the sensing rod, respectively, for pivoting about axes which are substantially perpendicular to the moving directions of the sensing rod and of the actuating element.

According to another feature of the invention, said connecting element is in the form of a wire spring with rectilinear parallel end parts which are rotatably received in said sensing rod and said actuating element, respectively.

The invention will now be described in detail, reference being made to the accompanying drawings in which.

Figure 1:
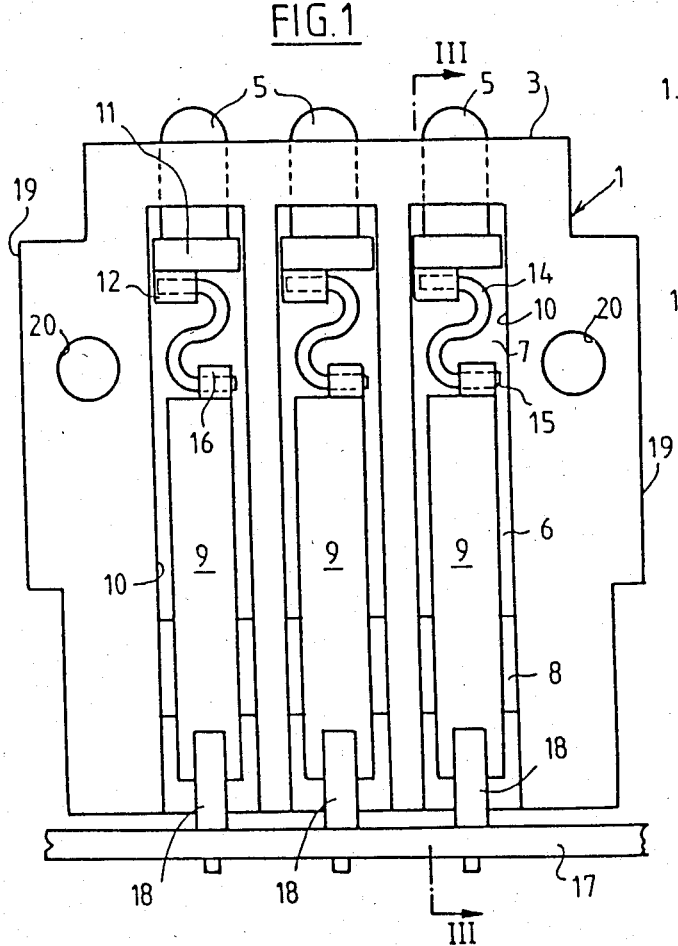
FIG. 1 is a side view of a reading device according to one embodiment of the invention.
Figure 3:
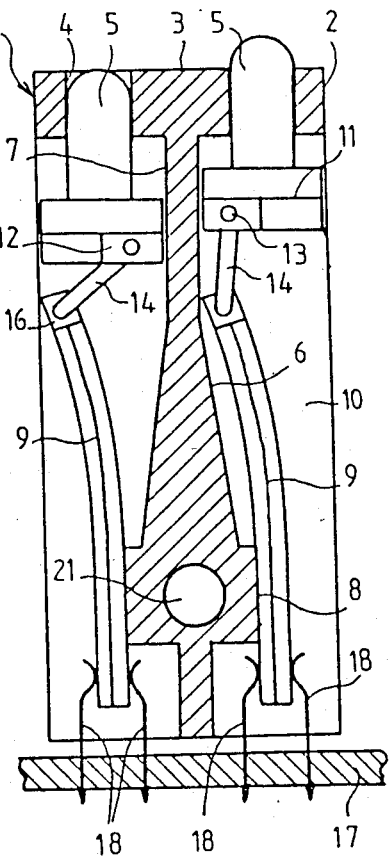
FIG. 3 is a cross-sectional view of the device shown in FIG. 1, taken along line III—III.
Figure 2:
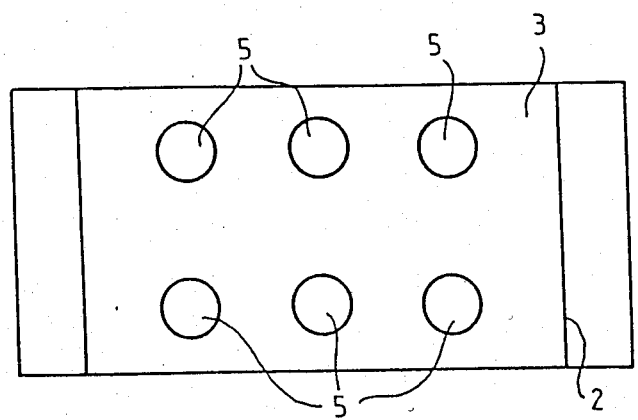
FIG. 2 is a plan view of the device shown in FIG. 1.

Referring now to the embodiment illustrated in FIGS. 1 to 3, the reading device comprises a support 1 with an upper part 2 having a flat upper surface 3 which constitutes the reading surface of the device. Said upper surface 3 is provided with openings 4 (FIG. 3) for six sensing rods 5, which, as illustrated in FIG. 2, are arranged in two parallel rows of three rods, which rods are axially movable in said openings 4 between a retracted position illustrated in the lefthand side of FIG. 3, and a protruding position illustrated in the righthand side of FIG. 3, in which the external rounded end of the sensing rod 5 protrudes above the reading surface 3.

The support 1 has a central part 6 forming, close to the upper part 2, a dividing wall 7 between the two rows of sensing rods 5. Close to its lower end, the central part 6 comprises a portion forming shoulder 8, substantially thicker than the dividing wall 7. In cross-section, the central part is inclined upwardly from the portion forming shoulder 8 of the dividing wall 7. On either side of said portion forming shoulder 8, are mounted the lower ends of the six piezo-electric elements 9, each one of which is placed below a sensing rod 5. The elements 9 may be secured to the portion forming shoulder 8 by adhesive or any other suitable means.

On this point, it will be noted on the drawings, that the length of elements 9 has been considerably reduced in order to illustrate as clearly as possible the principles of the present invention. For example, in FIGS. 1 and 3, the upper and lower parts of the devices are represented to scale, whereas the intermediate part which contains the truncated portion of the central part 6 has been compressed in the vertical direction.

For every one of the sensing rods 5 and of the corresponding elements 9, there is provided a vertical corresponding rectangular opening 10 in the side of the support 1. Each cylindrical sensing rod 5 comprises a rectangular base 11, mounted for sliding in the upper part of said rectangular opening 10. At the lower part of said rectangular base 11, there is provided a pivot bearing 12 on the dividing wall side 7, in order to receive a rectilinear end portion of an S-shaped wire spring 14, the other rectilinear end portion 15 which is parallel to the first portion 13 being mounted for pivoting in a bearing 16 on the upper end of element 9. A printed circuit board 17 for the electronic components (not shown), necessary to operate the reading device, comprises pairs of elastic contacts 18, each pair gripping the lower part of one of the elements 9 with a view to applying an operating voltage on the opposite faces of said element 9. When the polarity of the voltage which is applied, is such that is causes the bending of the elements 9 in a direction away from the dividing wall 7, as illustrated on the lefthand side of FIG. 3, the corresponding sensing rod is drawn downwardly towards the illustrated position, under the action of the elastic connection represented by the wire spring 14. If the voltage polarity is reversed, so that the element 9 is deformed by bending in towards the dividing wall 7, as illustrated on the righthand side of FIG. 3, the sensing rod 5 is pushed back upwardly to its protruding position.

The wire spring 14 and the element 9 form a pair of link rods which have a neutral position in which the ends 13 and 15 of the spring 14 and the center of curvature of the element 9 at the level of the shoulder 8 are all placed in the same plane. This position is overtaken when the sensing rod is brought to its protruding position as illustrated in the righthand-side of FIG. 3 and, what is more, the bearing 16 on the end of element 9 abuts against the wall 7, so that a pressure applied downwardly on the rod 5 will tend to apply the bearing 16 more and more against the wall 7. Said pressure however is absorbed to a large extent by the spring 14. Owing to this arrangement, there is no need to apply any extra electric power to the elements 9 in order to allow and compensate for the reading pressure applied on the sensing rods 5.

The end walls 19 of the support 1 which extend perpendicularly to the dividing wall 7 are provided with openings 20 for receiving connecting bars with a view to securing together a number of units of characters side by side so as to form a line of characters. In like manner, the portion forming shoulder 8 comprises an opening 21 directed perpendicularly to opening 20 in order to facilitate the re-grouping, in aligned rows, of units of characters, by introducing a connecting bar through said openings.

According to the embodiment illustrated in FIGS. 1 to 3 it is possible to place several lines of characters side by side and at short distance one from the other to form a page of Braille characters. It is also possible, by placing the sensing rods at regular intervals, both vertically and horizontally, to constitute a matrix formed of sensing rods disposed so regularly as to display graphisms which may be recognized by the touch.

Figure 4:
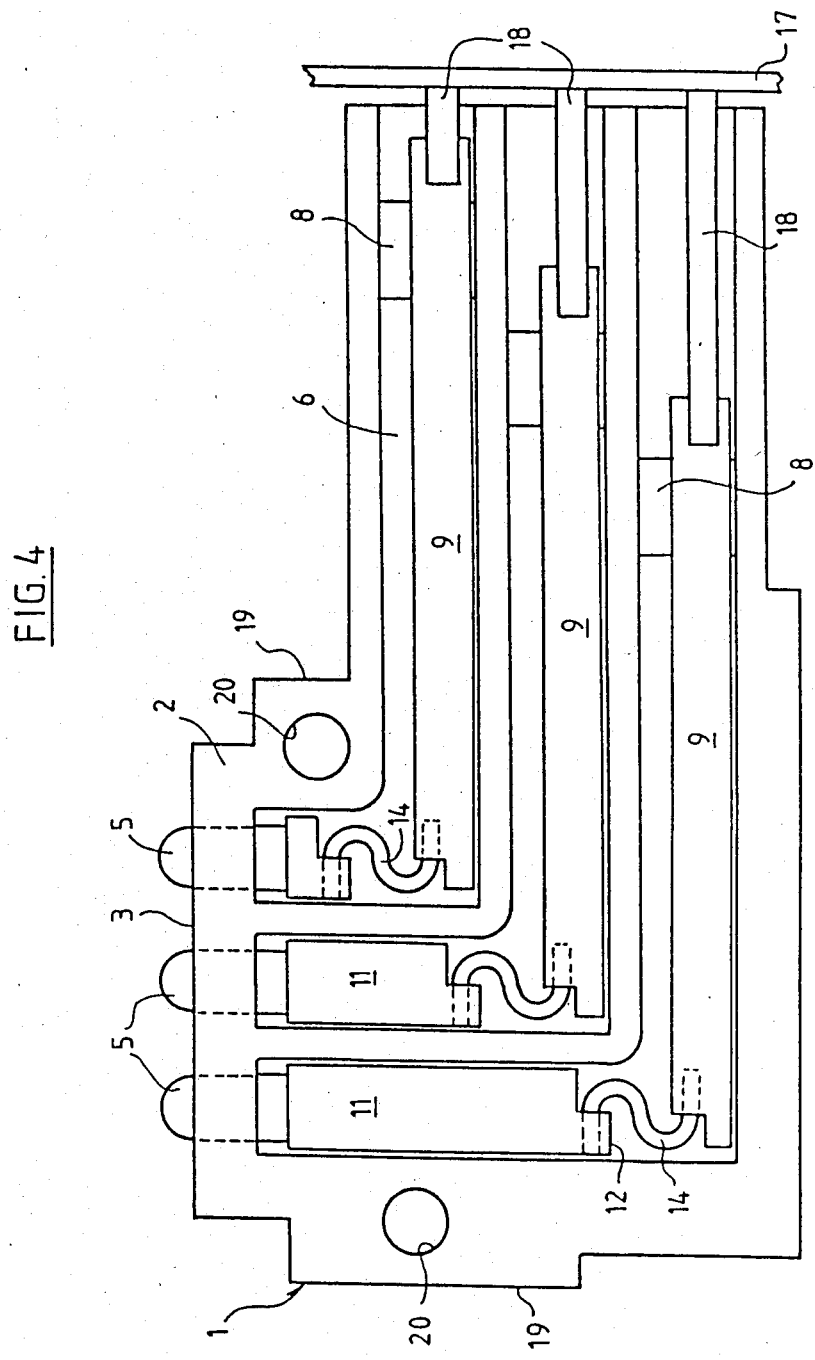
FIG. 4 is a side view of a reading device according to another embodiment of the invention.

The embodiment illustrated in FIG. 4 differs from that previously described, essentially in that the piezo-electric elements 9 are mounted perpendicularly to the axis of rods 5, namely parallely to the reading surface 3. The components or parts which are identical to those of the embodiment illustrated in FIGS. 1 to 3, have been given the same reference numbers. The S-shaped wire spring 14, which constitutes the connection between each element 9 and the corresponding sensing rod 5, is mounted by its upper part, for pivoting inside a bearing which is provided at the lower part of the base 11 of the sensing rod 5, in the same way as described with respect to the first embodiment, whereas the lower part of the spring is connected to the element 9 by means of a bearing which extends in the longitudinal direction from element 9. The embodiment illustrated in FIG. 4 works in the same way as that illustrated in FIGS. 1 to 3.

Although the way, in which the elements 9 of the device according to FIG. 4 stretch horizontally, prevents the production of devices having more than two contiguous display lines, its advantage nevertheless remains that its vertical overall dimensions are very reduced, this permitting the production of a "pocket-size" apparatus of small thickness. The horizontal disposition of elements 9 further allows the use of very long elements which may be controlled with low voltage and permits the production of battery-fed "pocket-size" Braille reading apparatuses.

Understandably, elements 9 may be placed under any angle with respect to the reading surface 3 between the perpendicular position of the first embodiment and the parallel position of the second embodiment.

It is also possible to bring various modifications to the aforedescribed embodiment, for example:

it is possible to use rigid connecting elements instead of the wire spring 14, the necessary elasticity being ensured either directly by the material constituting the sensing rod 5, or by way of a separate element incorporated between the rod 5 and the connecting element 14;

or it is possible to use other actuating elements instead of the piezo-electric elements 9, such as for example electrets, or components in magnetostrictive materials.

The means transmitting the displacement between the actuating element 9 and the sensing rod 5, need not be in the form of a link of the type of spring 14. As a variant, the underface of the base 11 of sensing rod 5 may be shaped as a cam surface which cooperates directly with the free end of the actuating element 9 or of any other actuating element. Such a cam surface could have a first surface which is long and inclined in a first direction, and joined to a second surface which is short and inclined in the other direction, with a transitional zone between the two surfaces and corresponding to the neutral point described hereinabove with reference to the first embodiment illustrated in FIGS. 1 to 3. According to another possibility, said cam surface can be produced in the form of a leaf spring fixed on the underface of the sensing rod 5 and which would procure the elasticity necessary to counteract the reading pressure.

Figure 5:
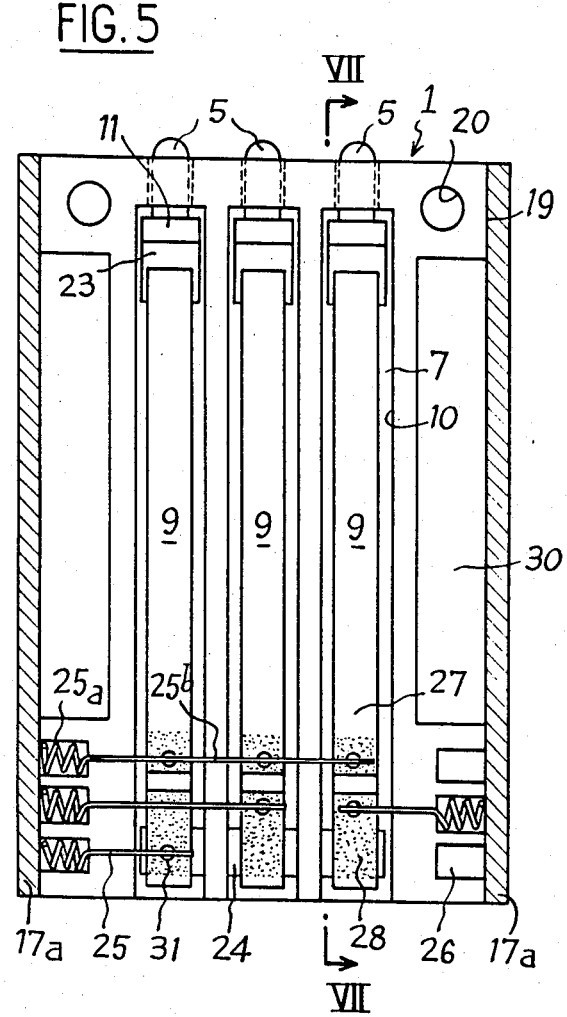
FIGS. 5 to 7 show a variant of embodiment, similarly to FIGS. 1 to 3.
Figure 7:
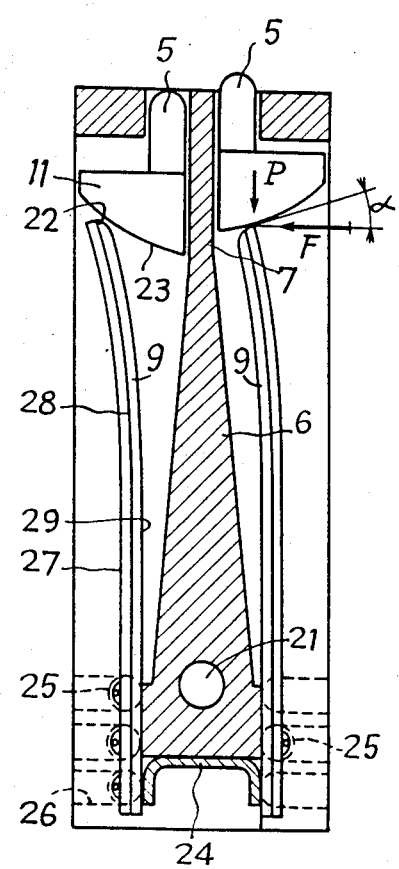
Figure 6:
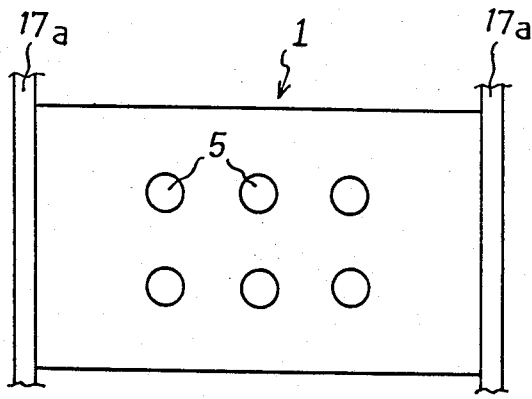

By way of example, FIGS. 5, 6 and 7 show a variant which calls on the use of means of transmitting movement through a cam surface. As illustrated, the lower face of the base 11 of the sensing rod 5 directly cooperates with the free end of the actuating element 9. Said free end comprises a rounded part 22 which is slidable over the cam surface 23 provided on the lower face of the base 11 of the sensing rod 5, so that the latter is pushed upwardly when the actuating element 9 bends in towards the intermediate wall 7, and that the sensing rod 5 goes down under its own weight when the actuating element 9 bends in the opposite direction.

A pressure P applied downwardly on the sensing rod 5 will be balanced by a horizontal bending force F applied on the cam surface 23 by the actuating element 9. Having called $\alpha$ the angle made with the horizontal plane perpendicular to the moving direction of rod 5 by the tangent to the cam surface 23 at the contact point with the rounded part 22 of the free end of actuating element 9, balance will be achieved if:

$$F = (tg\alpha - f)P/(1 + f tg\alpha)$$

f being the sliding friction coefficient of the surface 22 on the surface 23.

If the inclination $tg\alpha$ of cam surface 23 is less than the friction coefficient f, there will be bracing of the base 11 of the sensing rod 5 on the actuating element 9. If, on the contrary, the inclination $tg\alpha$ of the cam surface 23 is greater than the friction coefficient f, there will be a bending of the actuating element 9 until the bending force F reaches such a value that a balance is achieved. If inclination $tg\alpha$ of the cam surface 23 is only slightly more than the friction coefficient f, a low friction force will be sufficient to compensate a relatively high pressure on the sensing rod 5.

For example, if $tg\alpha = 0.5$ and $f = 0.4$, balance will be achieved if:

$$F = 0.1P/1.2.$$

A bending force of 1 g exerted by the actuating element 9 will therefore be sufficient to balance a pressure of 12 g exerted on the sensing rod 5.

The elasticity required to counteract the reading pressure can thus be obtained by the shape given to the cam surface 23 without it being necessary to use elastic materials to produce the assembly consisting of the sensing rod 5 and its base 11.

FIGS. 5, 6 and 7 also show a variant in the manner of feeding electric power to the actuating elements 9, when these are constituted by dimorphic piezo-electric elements.

The support 1 is gripped between two printed circuits 17a resting against the side faces 19 of support 1. Said printed circuits carry the electronic components enabling the selective application of the electric voltages necessary to operate the piezo-electric elements 9. Said electronic components are housed inside rectangular recesses 30 provided in the side faces of the support 1.

The electric voltages are transmitted from the printed circuits 17a to the actuating elements 9 via contact springs 25 comprising a helical part 25a inserted in recesses 26 provided in the side faces 19 of the support 1 so as to produce an elastic electrical contact with the printed circuits 17a, and a rectilinear part 25b connected respectively to the external electrodes 27 or to the middle electrodes 28 of the piezo-electric actuating elements 9. Said connection may be achieved by weldings 31. The actuating elements 9 are fixed by their internal electrode 29 to a U-shaped metal claw 24, which latter is adequately secured to the lower face of the support 1.

We claim:

1. A tactile reading device of the type comprising a reading surface (3) provided with openings (4) for a number of sensing rods (5) adapted to move reciprocally axially between a protruding position and a retracted position with respect to said surface, each one of which rods can be moved between said positions by means of an end part of an elongated actuating element (9) of which the other end part is fixed, said actuating element (9) being adapted to move by curvature deformation perpendicularly to its longitudinal axis between two end positions by applying an actuating force thereto, wherein the improvement comprises the fact that the curvature direction of said actuating element (9) is substantially perpendicular to the displacement direction of the sensing rod (5) and that displacement transmitting means (14) are provided between the actuating element (9) and the sensing rod (5), said displacement transmitting means (14) presenting a substantially neutral point close to that of the end positions of the actuating element (9) in which the sensing rod (5) occupies its protruding position.

2. Device according to claim 1, characterized by the fact that an abutment (7) is provided to prevent the curvature deformation of the actuating element (9) beyond said end position.

3. Device according to claim 1, characterized by the fact that the longitudinal axis of the actuating element (9) is substantially parallel to said reading surface (3).

4. Device according to claim 1, characterized by the fact that the longitudinal axis of the actuating element (9) is substantially perpendicular to said reading surface (3).

5. Device according to claim 1, characterized by the fact that said displacement transmitting means (14) comprise an elastic element.

6. Device according to claim 1, characterized by the fact that said displacement transmitting means (14) are in the form of a connecting element having its ends (13,15) connected to the actuating element (9) and to the sensing rod (5), respectively, for pivoting about axes which are substantially perpendicular to the moving direction of the sensing rod (5) and of the actuating element (9).

7. Device according to claim 6, characterized by the fact that said actuating element is in the form of a wire spring (14) with parallel rectilinear end portions (13,15) which are received in pivoting bearings (12,16) of the sensing rod (5) and of the actuating element (9), respectively.

8. Device according to claim 1, characterized by the fact that said displacement transmitting means (14) are in the form of a cam surface (23) formed by the lower face (11) of the sensing rod (5) cooperating directly with the free end of the actuating element (9), the shape of the cam surface being so selected as to obtain the required elasticity to counteract the reading pressure applied on the sensing rods (5).

* * * * *